(12) United States Patent
Woelfing et al.

(10) Patent No.: US 9,599,313 B2
(45) Date of Patent: Mar. 21, 2017

(54) GENERATION OF WHITE LIGHT

(71) Applicant: SCHOTT AG, Mainz (DE)

(72) Inventors: Bernd Woelfing, Mainz (DE); Volker Hagemann, Klein-Winternheim (DE); Juergen Meinl, Hohenstein-Holzhausen (DE)

(73) Assignee: SCHOTT AG, Mainz (DE)

( * ) Notice: Subject to any disclaimer, the term of this patent is extended or adjusted under 35 U.S.C. 154(b) by 117 days.

(21) Appl. No.: 14/492,125

(22) Filed: Sep. 22, 2014

(65) Prior Publication Data
US 2015/0092392 A1 Apr. 2, 2015

Related U.S. Application Data

(63) Continuation of application No. PCT/EP2013/054708, filed on Mar. 8, 2013.

(60) Provisional application No. 61/614,040, filed on Mar. 22, 2012.

(30) Foreign Application Priority Data

Mar. 22, 2012 (DE) ........................ 10 2012 005 658

(51) Int. Cl.
*F21V 9/16* (2006.01)
*C09K 11/77* (2006.01)
*G02B 27/14* (2006.01)
*H01S 5/00* (2006.01)

(52) U.S. Cl.
CPC ............ *F21V 9/16* (2013.01); *C09K 11/7774* (2013.01); *F21K 9/64* (2016.08); *G02B 27/141* (2013.01); *G02B 27/142* (2013.01); *H01S 5/005* (2013.01); *Y02B 20/181* (2013.01)

(58) Field of Classification Search
CPC . C09K 11/774; F21K 9/56; F21K 9/64; F21V 9/16; G02B 27/141; G02B 27/142; H01S 5/005; Y02B 20/181
See application file for complete search history.

(56) References Cited

U.S. PATENT DOCUMENTS

| | | | |
|---|---|---|---|
| 7,356,054 B2 | 4/2008 | Hama et al. | |
| 7,433,115 B2 | 10/2008 | Hama et al. | |
| 7,654,712 B2 | 2/2010 | Takeda et al. | |
| 7,758,224 B2 | 7/2010 | Hama et al. | |
| 2002/0043926 A1 | 4/2002 | Takahashi et al. | |

(Continued)

FOREIGN PATENT DOCUMENTS

| | | |
|---|---|---|
| CN | 101936489 A | 1/2011 |
| DE | 102007037875 A1 | 2/2009 |

(Continued)

OTHER PUBLICATIONS

English translation of International Search Report dated Jun. 12, 2013 for corresponding PCT/EP2013/054708, 2 pages.

(Continued)

*Primary Examiner* — Stephen F Husar
(74) *Attorney, Agent, or Firm* — Ohlandt, Greeley, Ruggiero & Perle, LLP

(57) ABSTRACT

An arrangement for generating white light is provided. The arrangement generates the white light by combining blue light and yellow light. The yellow light originates from a converter which transforms into yellow light virtually all blue light that enters the converter.

16 Claims, 3 Drawing Sheets

(56) References Cited

U.S. PATENT DOCUMENTS

| | | |
|---|---|---|
| 2006/0124951 A1 | 6/2006 | Sakata et al. |
| 2007/0189352 A1 | 8/2007 | Nagahama et al. |
| 2010/0072488 A1* | 3/2010 | Bierhuizen ........... H01L 33/505 257/88 |
| 2011/0157865 A1 | 6/2011 | Takahashi et al. |
| 2011/0182070 A1* | 7/2011 | Curran ..................... F21K 9/00 362/235 |
| 2012/0001204 A1 | 1/2012 | Jagt |
| 2012/0057326 A1 | 3/2012 | Zheng et al. |
| 2015/0062953 A1* | 3/2015 | Woelfing ................ B60Q 1/00 362/551 |
| 2015/0070907 A1 | 3/2015 | Hagemann et al. |
| 2015/0077973 A1* | 3/2015 | Hagemann ......... C09K 11/7774 362/84 |

FOREIGN PATENT DOCUMENTS

| | | |
|---|---|---|
| DE | 102008030253 A1 | 12/2009 |
| DE | 102009056463 A1 | 6/2011 |
| DE | 102010028949 A1 | 11/2011 |
| JP | 2009105125 A | 5/2009 |
| WO | 2004105647 A1 | 12/2004 |

OTHER PUBLICATIONS

English translation of Written Opinion of the International Searching Authority dated Jun. 12, 2013 for corresponding PCT/EP2013/054708, 5 pages.

English translation of International Preliminary Report on Patentability dated Sep. 23, 2014 for corresponding PCT/EP2013/054708, 6 pages.

German Office Action dated Jun. 12, 2013 for corresponding German Patent Application No. 10 2012 005 658.3 with English translation, 13 pages.

* cited by examiner

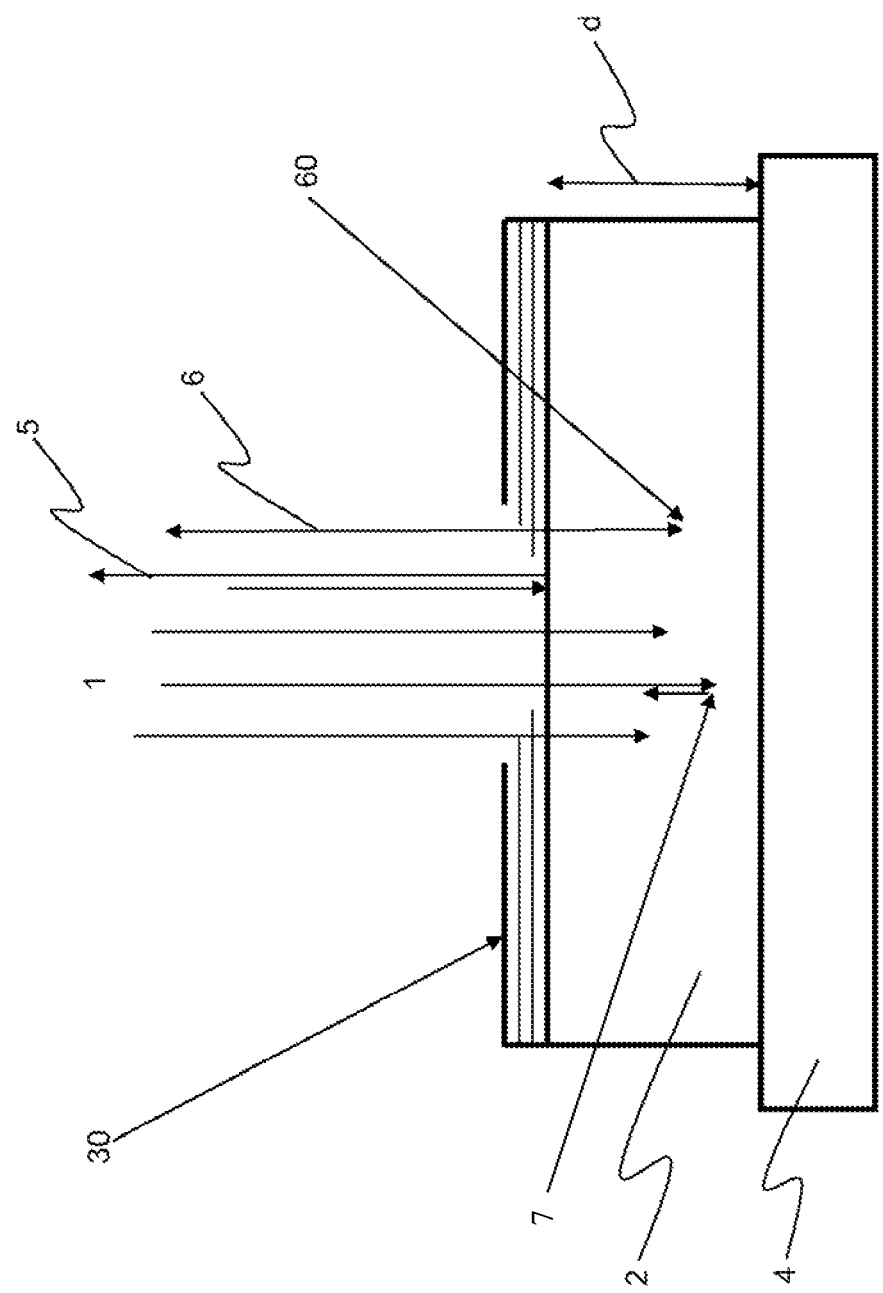

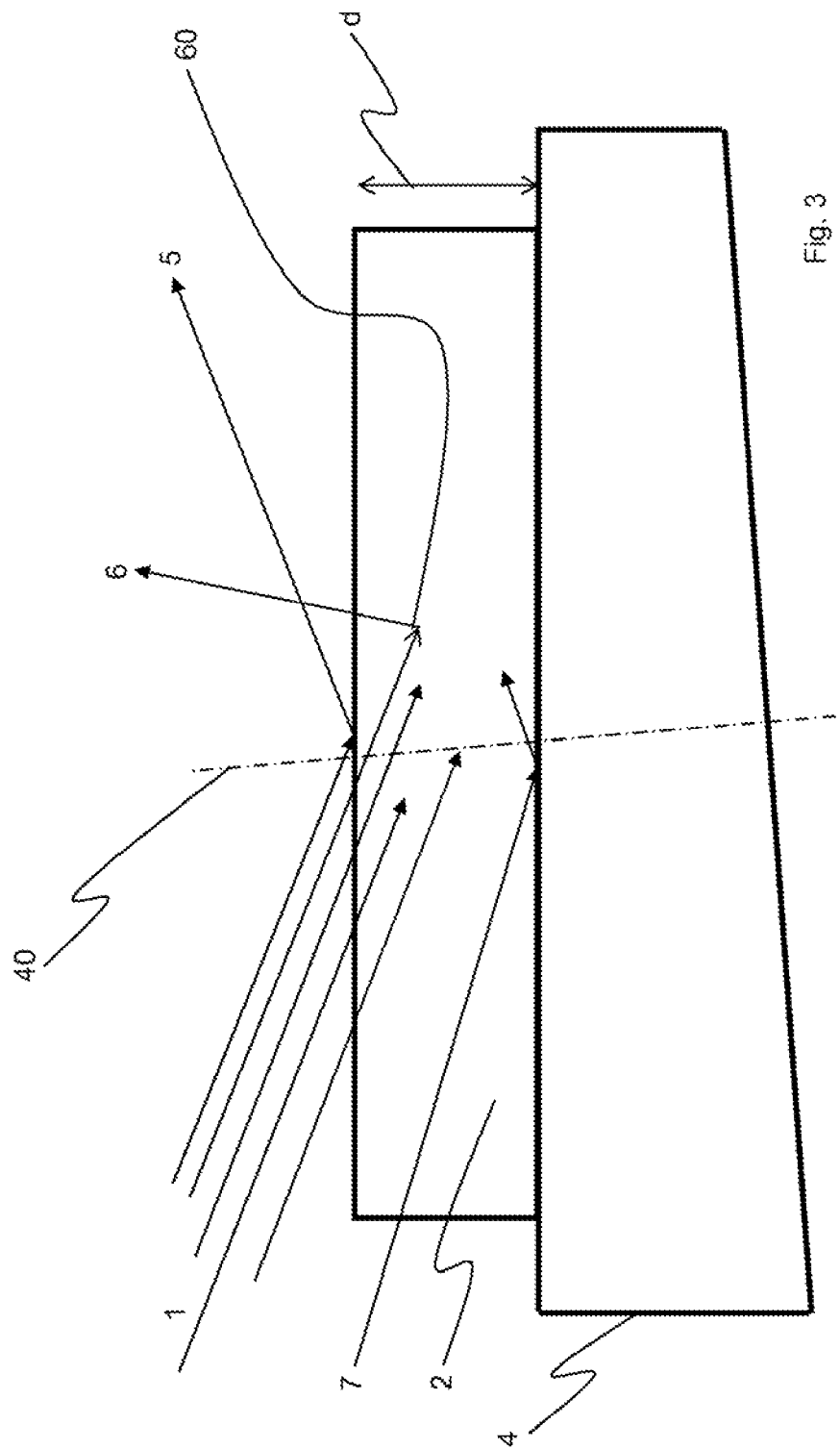

GENERATION OF WHITE LIGHT

CROSS REFERENCE TO RELATED APPLICATIONS

This application is a continuation of International Application No. PCT/EP2013/054708 filed Mar. 8, 2013, which claims the benefit of U.S. Provisional Application Ser. No. 61/614,040, filed Mar. 22, 2012 and claims benefit under 35 U.S.C. §119(a) of German Patent Application No. 10 2012 005 658.3, filed Mar. 22, 2012, the entire contents of all of which are incorporated herein by reference.

BACKGROUND

1. Field of the Disclosure

The invention relates to an arrangement for generating in particular white light using blue light and a converter for converting blue light into yellow light and by combining these spectral components.

2. Description of Related Art

Such white light generating arrangements are widely known such as, for example, those disclosed in: WO 2004/105647A1, JP 2009105125, U.S. Pat. No. 7,654,712 B2, U.S. 2007/189352A1, U.S. Pat. No. 7,758,224 B2, U.S. Pat. No. 7,433,115 B2, U.S. Pat. No. 7,356,054 B2, and DE 10 2010 028949. The ratio of the blue light component to the yellow light component in the illumination light generated depends on the conversion medium which converts the blue light incident from an excitation light source into yellow light as a component of the illuminating light. In order to arrive in the white region of the chromaticity diagram, various parameters of the converter must be met precisely, including the doping of the converter material, light scattering in the converter material, and the thickness of the converter. Only with a precise adjustment of such parameters it is possible to achieve the correct spectral ratio of blue to yellow light so as to obtain white light.

SUMMARY

The invention is based on the object to provide an arrangement for adjusting the color location of light, which allows for greater tolerances in material parameters such as thickness of the converter, doping of the converter material, light scattering in the converter, and which allows for use of converter materials in which the white spectral region cannot be achieved by conversion alone.

Specifically, an excitation light source for blue light is provided, and a converter for converting substantially all the entering blue light into yellow light. A support or carrier aligns the surface of the converter relative to the excitation light source and in the direction of illumination, in a remission geometry. In order to convert, in the converter, substantially all blue light that enters into yellow light, the thickness of the converter is chosen appropriately large. For adjusting, in the chromaticity diagram, the desired color location which results from a combination of the converted and unconverted light, the surface of the converter is provided with an optical coating. In this manner, white light can be mixed from reflected blue light and remitted yellow light irrespectively of the material parameters of the converter.

In order to obtain an appropriate mixing ratio between blue and yellow light, the optical coating may have a reflection factor in a range from R=0.1 to R=0.3 for incident light of a wavelength in a range from 430 to 460 mm, and a reflection factor of R<0.05, more preferably R<0.01, for exiting converted light of a wavelength in a range from 480 to 650 nm. Thus, in this embodiment of the invention, 70% to 90% of the blue light will enter the converter, where it is virtually completely converted into yellow light (and heat). The optical coating is, however, capable of substantially completely transmitting the converted light, so that the yellow light generated will form a component of the emitted illumination light, which will appear white because of the combination of blue and yellow. A dichroic layer or a thin metallic layer may be used as the optical coating.

However, it is also possible to work with a scattering layer, for example a thin paint coat. Usually, an advantage of such a layer is that the portion of excitation light which is reflected, is not reflected specularly but diffusely, i.e. is backscattered. In this manner, the angular distribution of the reflected excitation light better combines with the converted light. If, however, separation of the two light components is not disadvantageous in the optical system, or is even desirable, specular reflection at a dichroic or metallic layer may be favorable as well. If, when using a scattering layer, specular reflection at the interface to the optically denser medium of the converter is absolutely undesirable, for example because the specular portion would produce undesirable optical effects or because the fraction of converted light is to be increased without reducing the fraction of scattered light, an anti-reflection layer (R<0.05, more preferably R<0.01) for the excitation light and the converted light is applied to the converter first, and thereupon the scattering layer.

By virtue of the scattering layer, also light exiting from the converter is inevitably backscattered into the converter. However, since the absorption length for the converted light in the converter is long, most of the backscattered light will again leave the converter.

The layer composition and the thickness of the optical coating is used as a regulator for adjusting the ratio of entering light to the reflected blue light.

The specific value of the reflection factor R in the application will depend on the wavelength of the excitation light and the spectrum of the converted light and the efficiency of the converter.

The object of the invention may also be solved without an optical coating on the surface of the converter, by taking into account the refractive index of the converter medium in determining the appropriate angle of the excitation light source relative to the surface of the converter. When light is incident on the surface of the converter at an oblique angle, then a portion will be reflected and another portion will enter the converter medium. The entering fraction of the excitation light is almost completely converted into yellow light and leaves the converter in the illumination direction, according to a remission geometry, where it combines with the reflected blue light from the excitation light source to ultimately produce a white light appearance.

Further details of the invention will become apparent from the description of exemplary embodiments, from the drawings and the claims.

BRIEF DESCRIPTION OF THE DRAWINGS

FIG. 2 is a sectional view through another converter having a thin metallic surface layer, and a support of the converter; and FIG. 3 is a sectional view through another converter.

DETAILED DESCRIPTION

Figure 1:
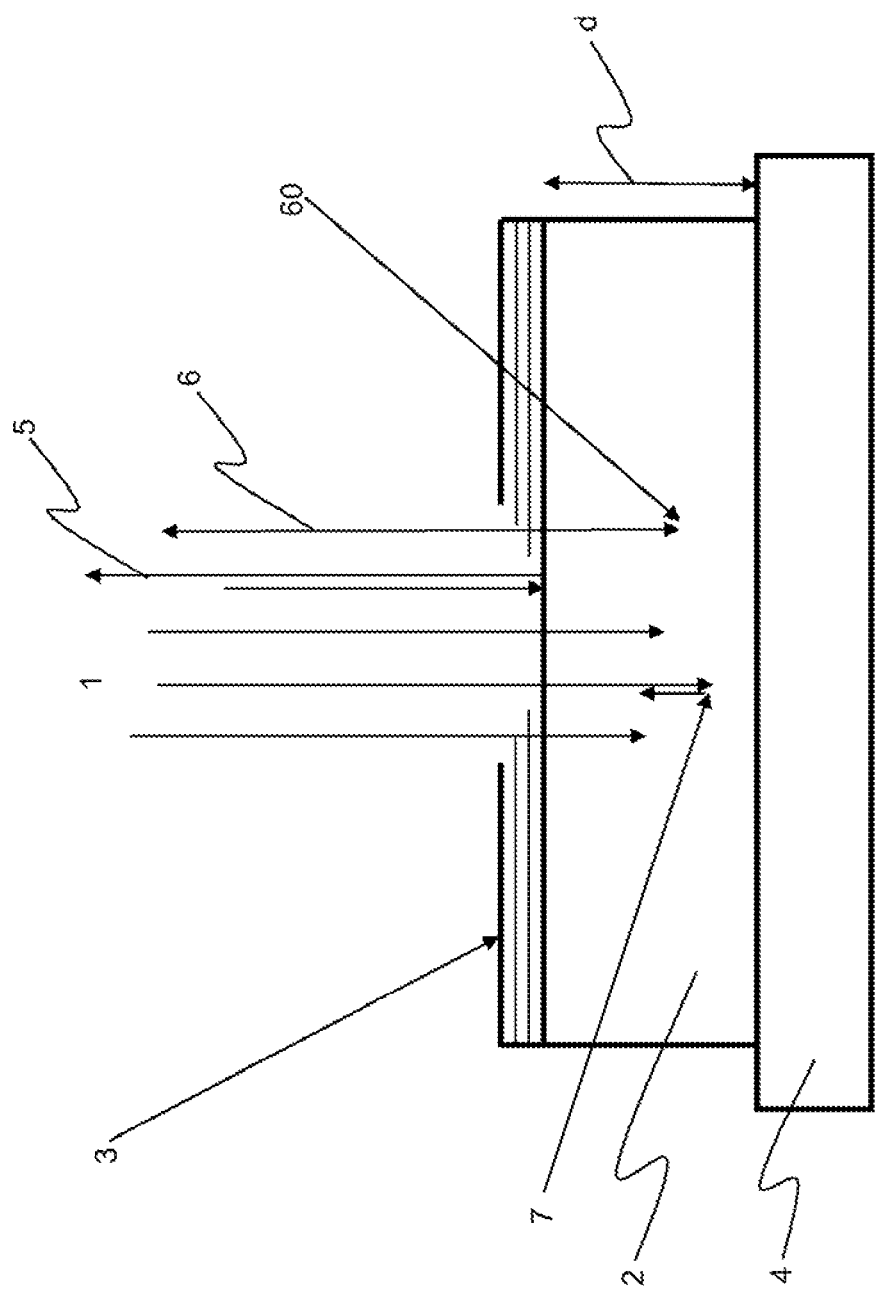
FIG. 1 is a sectional view through a converter having a dichroic surface layer, and a support of the converter.

FIG. 1 schematically illustrates an arrangement for generating white light, which comprises an excitation light source for blue light 1, e.g. a diode laser, and a converter 2 which has a coating 3 on its surface and which is attached on a carrier or support 4. The converter material may be a Ce:YAG ceramic material. Coating 3 is an optical coating for which a dichroic layer or a thin metallic layer is employed. Coating 3 divides the excitation light beam into a portion of reflected light and a portion of entering light. For the purpose of defining these fractions of light, an angle of the incident light to the surface of the converter is usually adjusted to be unequal to 90°. The entering blue light 1 is converted into yellow light 6 by the converter 2, and this the more, the more deeply the light penetrates into the converter, and is output as a light lobe, not shown. A conversion point is indicated at 60. From there, the converted light propagates in all directions. According to the invention, the thickness (d) of the converter is selected to have at least a dimension so that substantially all the light that enters the converter is converted.

The carrier or support 4 is configured to be reflective, in order to reflect the entering blue light 1 and especially converted yellow light, which is illustrated at 7. Due to the reflectivity of the carrier or support 4, converter material may be economized.

The proportion of reflected blue light is determined through the composition and layer thickness of coating 3. The reflected light is illustrated at 5, and the emitted yellow light at 6. The blue and yellow light combine to produce white light in the illumination direction of the arrangement.

Coating 3 is an optical coating whose configuration additionally depends on the refractive index of the conversion medium, in order to reflect or to transmit the proper fraction at the proper angle. Optical coating 3 has a preselectable reflection factor in the blue light spectrum ranging from 430 to 460 nm, in order to achieve the desired result of white light by combination with the emitted yellow component of the light. An appropriate value for the reflection factor is R=0.2. The reflection factor of the optical coating also depends on the angle of incidence on the converter. This is taken into account in the design of the optical coating.

The converted yellow light is to be emitted as completely as possible in a spectral range from 480 nm to 650 nm and with an angular distribution from 0° to 60° to the surface normal of the converter. The optical coating is designed to exhibit a reflection factor of <0.05, more preferably <0.01, in the spectral range from 480 to 650 nm.

FIG. 2 shows an embodiment of the arrangement for adjusting the color location of light, which includes a scattering layer 30. The other elements correspond to those of the embodiment of FIG. 1. Again, the thickness (d) of the converter is at least as large that essentially all the light that enters the converter is converted. The proportion of reflected blue light is defined through the scattering layer 30. The scattering layer 30 may, for example, be a thin coat of white paint. Below scattering layer 30, an anti-reflection layer may extend which minimizes unwanted reflection of the excitation light.

FIG. 3 shows a third embodiment of the invention. Elements similar to those of the embodiments described above are designated with the same reference numerals. The blue excitation light 1 is irradiated at an angle to the surface normal of the converter and is thereby progressively converted into yellow light, and part of the blue light reaches the reflective surface of the carrier or support 4 and is reflected there, but is substantially entirely absorbed before reaching the surface of the converter. An absorption and conversion point is shown at 60. The converted light propagates to all sides, i.e. also in the illumination direction, as indicated at 6. Part of the converted light is also reflected by the reflective surface of the carrier or support 4 and leaves the converter in the illumination direction.

The carrier or support 4 may be formed as a wedge-shaped plate which is rotatable around a rotation axis 40. When the converter 2 is turned around this rotation axis 40, the angle of incidence of excitation light 1 is altering. This permits fine-tuning of the angle of incidence with respect to the surface of the converter, which may also be done subsequently, when the excitation light source is not provided with a uniform excitation wavelength.

The fraction of reflected blue light 5 is determined by the laws of reflection at a transition of light from a thinner medium into an optically denser medium. By suitably choosing the angle of incidence of the excitation light 1 to the surface of the converter 2, the ratio between converted and non-converted light is adjusted, and thus the mixing ratio between reflected blue light and emitted yellow light. In this way, it is possible to adjust the color location in the chromaticity diagram so as to generate white light.

Exemplary Embodiment

The converter material used was a Ce:YAG ceramic material having a refractive index of 1.833. The reflected fraction was chosen to be 0.2. This gives an angle of incidence of 68.3°. A deviation in the angle of incidence of +/−one degree only leads to a change of +/−1% of the reflected fraction (0.19 and 0.21). A deviation in the refractive index of 0.05 also leads to a change of only +/−1% of the reflected fraction. Both parameters may be adjusted more precisely without great technical effort.

In case a converter platelet of 0.2 mm thickness is used in transmission or in remission in a manner so that the unconverted fraction is 0.2, the thickness thereof has to be adjusted exactly within +/−6 µm in order to likewise obtain an accuracy of +/−1% of the fraction of unconverted light.

If a light source with polarized light is provided, the latter may be used to obtain the fraction of 0.2 of reflected light already at smaller angles. With vertical polarization, this condition is already satisfied at 50.6°. In this case, the light spot on the converter will not be distorted so much as with non-polarized light. In this case an angular accuracy of +/−1.5° will suffice to keep the reflected fraction between 0.19 and 0.21.

What is claimed is:

1. An arrangement for generating white illumination light, comprising:
   an excitation light source emitting an excitation light beam having blue light;
   a reflective coating that divides the excitation light beam into a portion of reflected blue light and a portion of entering blue light;
   a converter for converting the entering blue light from the excitation light source into yellow light and having a first converter surface where the entering blue light from the excitation light source enters, and a second converter surface opposite to the first converter surface; and
   a support of the converter for aligning the converter in a remission geometry in an angle relative to the excitation light source and in a direction of illumination;
   wherein the reflective coating is on the first converter surface for adjusting the portion of reflected blue light relative to the portion of the entering blue light;
   wherein the converter has a thickness as measured from the first converter surface to the second converter surface at the support sufficient so that substantially all the entering blue light is converted into the yellow light.

2. The arrangement as claimed in claim 1, wherein the coating is an optical coating and has a reflection factor in a range from R=0.1 to R=0.3 for the excitation light beam of a wavelength in a range from 430 to 460 nm, and a reflection factor of R<0.05 for light exiting the converter of a wavelength in a range from 480 to 650 nm.

3. The arrangement as claimed in claim 2, wherein the optical coating is a dichroic layer.

4. The arrangement as claimed in claim 2, wherein the optical coating is a thin metallic layer.

5. The arrangement as claimed in claim 1, wherein the coating is a scattering layer that is a thin paint coat, further comprising an antireflection layer on the converter below the scattering layer.

6. The arrangement as claimed in claim 2, wherein the optical coating has a composition and thickness sufficient to adjust the portion of entering blue light relative to the portion of reflected blue light.

7. The arrangement as claimed in claim 1, wherein the converter is a Ce:YAG ceramic.

8. The arrangement as claimed in claim 1, wherein the converter is a Ce:TAG ceramic.

9. The arrangement as claimed in claim 1, wherein the converter is a Ce:LuAG ceramic.

10. An arrangement for generating white illumination light, comprising:
an excitation light source emitting an excitation light beam having blue light;
a converter, wherein the excitation light beam is divided into a portion of reflected blue light and a portion of entering blue light at the converter, the converter converting the entering blue light, incident on a first converter surface, into yellow light, the excitation light beam being incident onto the first converter surface in an angle of incidence relative to a direction normal to the first converter surface; and
a support of the converter for aligning the converter in a remission geometry in the angle of incidence relative to the excitation light source and in a direction of illumination,
wherein the converter has a thickness as measured from the first converter surface to the support that is sufficient so that substantially all the entering blue light is converted into the yellow light,
when the white illumination light is generated by a combination of the portion of reflected blue light and the yellow light, and wherein, due to laws for transition of light from an optically thinner to an optically denser medium, the angle of incidence determines the portion of reflected blue light relative to a portion of the yellow light in the white illumination light.

11. The arrangement as claimed in claim 10, wherein the angle of incidence of the excitation light beam onto the first converter surface is an angular range from 60° to 75°.

12. The arrangement as claimed in claim 10, wherein the blue light is polarized perpendicularly to the first converter surface, and wherein the angle of incidence of the excitation light beam onto the first converter surface is in an angular range from 35° to 70°.

13. The arrangement as claimed in claim 10, wherein the support comprises a rotatable wedge-shaped plate so that by rotation of the wedge-shaped plate the angle of incidence of the excitation light beam onto the first converter surface is varied.

14. The arrangement as claimed in claim 10, wherein the converter is a Ce:YAG ceramic.

15. The arrangement as claimed in claim 10, wherein the converter is a Ce:TAG ceramic.

16. The arrangement as claimed in claim 10, wherein the converter is a Ce:LuAG ceramic.

* * * * *